US006376601B1

(12) United States Patent
Kobayashi et al.

(10) Patent No.: US 6,376,601 B1
(45) Date of Patent: Apr. 23, 2002

(54) HIGH-REFRACTIVE-INDEX OPTICAL SILICONE OIL AND HIGH-REFRACTIVE-INDEX OPTICAL SILICONE OIL MIXTURE

(75) Inventors: Hideki Kobayashi; Mari Tateishi; Tadashi Okawa, all of Chiba Prefecture (JP)

(73) Assignee: Dow Corning Toray Silicone Co., Ltd., Tokyo (JP)

( * ) Notice: Subject to any disclaimer, the term of this patent is extended or adjusted under 35 U.S.C. 154(b) by 0 days.

(21) Appl. No.: 09/489,417

(22) Filed: Jan. 21, 2000

(30) Foreign Application Priority Data

Jan. 22, 1999 (JP) ............................................. 11-014462

(51) Int. Cl.$^7$ ............................................. C08K 5/5419
(52) U.S. Cl. ........................... 524/588; 528/15; 528/31; 528/25; 556/451
(58) Field of Search ........................ 524/588; 556/451; 528/31, 15, 25; 502/325, 185

(56) References Cited

U.S. PATENT DOCUMENTS

| | | | |
|---|---|---|---|
| 3,088,964 A | 5/1963 | Ryan | 260/448.2 |
| 3,186,964 A | 6/1965 | Kookootsedes et al. | 260/46.5 |
| 3,839,384 A | 10/1974 | Morehouse | 260/448.2 |
| 5,300,669 A | 4/1994 | Akamatsu | 556/453 |
| 6,133,394 A | * 10/2000 | Furukawa et al. | |

FOREIGN PATENT DOCUMENTS

| | | | |
|---|---|---|---|
| EP | 0 641 799 A2 | 3/1995 | C07F/7/08 |
| JP | 6092973 | 4/1994 | C07F/7/08 |
| JP | 11158188 | 6/1999 | C07F/7/08 |
| WO | WO 00/27348 | 5/2000 | A61K/7/06 |

* cited by examiner

Primary Examiner—Philip Tucker
Assistant Examiner—Kuo-Liang Peng
(74) Attorney, Agent, or Firm—Larry A. Milco; Catherine U. Brown (57) ABSTRACT

A high-refractive-index optical silicone oil comprising a pentasiloxane having the formula $RMe_2SiO(Me_2SiO)_3SiMe_2R$ wherein Me is methyl, each R is independently a $C_8$ to $C_{12}$ aralkyl, and the silicone oil has a refractive index of from 1.45 to 1.50 at 25° C.; a method of preparing a high-refractive-index optical silicone oil; a high-refractive-index optical silicone oil mixture comprising a pentasiloxane having the formula $RMe_2SiO(Me_2SiO)_3SiMe_2R$ wherein Me is methyl, each R is independently a $C_8$ to $C_{12}$ aralkyl, and a disiloxane having the formula $RMe_2SiOSiMe_2R$ wherein Me and R as defined above and wherein the mixture has a refractive index of from 1.45 to 1.50 at 25° C.; and a method of preparing a high-refractive-index optical silicone oil mixture.

9 Claims, 5 Drawing Sheets

HIGH-REFRACTIVE-INDEX OPTICAL SILICONE OIL AND HIGH-REFRACTIVE-INDEX OPTICAL SILICONE OIL MIXTURE

FIELD OF THE INVENTION

This invention relates to a high-refractive-index optical silicone oil and to a high-refractive-index optical silicone oil mixture. More particularly, this invention relates to a high-refractive-index optical silicone oil and a high-refractive-index optical silicone oil mixture comprising a pentasiloxane having terminal aralkyl groups, wherein the oil has a refractive index from 1.45 to 1.50 at 25° C.

BACKGROUND OF THE INVENTION

Optical silicone oils, like optical adhesives and optical greases, are used as fillers between lenses and between prisms in optical devices and as fillers in the connectors used for optical fibers. However, when an optical silicone oil is employed as the fill between lenses or prisms or between the terminal surfaces of optical fibers, any residual bubbles present in the silicone oil and/or bubbles produced along the interface between the silicone oil and lens, prism, or optical fiber terminal function to scatter the transmitted light or optical signal and thereby cause flare or transmission losses. To counter this, low-viscosity phenyl-type silicone oils with viscosities (25° C.) in the range from 1 to 70 mm$^2$/s and refractive indices (25° C.) in the range from 1.46 to 1.51 have been used as optical silicone oils. Unfortunately, the phenyl-type silicone oils typically have broad molecular weight distributions, which has led to the problem of time-wise changes in the refractive index due to volatilization of the phenyl-type silicone oil in the low molecular weight region.

Within the realm of the 2-methylphenethyl-functional optical silicone oils, Japanese Laid Open (Kokai or Unexamined) Patent Application Number Hei 6-92973 (92,973/1994) teaches a disiloxane having a 2-methylphenethyl group at one or both terminals. Due to its narrow molecular weight distribution, this disiloxane offers the advantage of undergoing no change in refractive index even when some amount of volatilization occurs. However, the disiloxane itself still suffers from a high volatility.

SUMMARY OF THE INVENTION

The present inventors have discovered that the aforementioned problems can be solved by using a pentasiloxane having terminal aralkyl groups.

In specific terms, the object of the present invention is to provide a low-volatility high-refractive-index optical silicone oil and a low-volatility high-refractive-index optical silicone oil mixture that undergo very little change in refractive index upon volatilization.

The present invention is directed to a high-refractive-index optical silicone oil comprising a pentasiloxane having the formula:

RMe$_2$SiO(Me$_2$SiO)$_3$SiMe$_2$R wherein Me is methyl, each R is independently a C$_8$ to C$_{12}$ aralkyl, and the silicone oil has a refractive index of from 1.45 to 1.50 at 25° C.

The present invention is also directed to a method of preparing a high-refractive-index optical silicone oil having a refractive index of from 1.45 to 1.50 at 25° C., comprising reacting a C$_8$ to C$_{12}$ aryl-containing olefin with a pentasiloxane having the formula:

HMe$_2$SiO(Me$_2$SiO)$_3$SiMe$_2$H in the presence of a supported platinum catalyst.

The present invention is further directed to a high-refractive-index optical silicone oil mixture, comprising a pentasiloxane having the formula:

RMe$_2$SiO(Me$_2$SiO)$_3$SiMe$_2$R wherein Me is methyl, each R is independently a C$_8$ to C$_{12}$ aralkyl, and a disiloxane having the formula:

RMe$_2$SiOSiMe$_2$R wherein Me and R as defined above and wherein the mixture has a refractive index of from 1.45 to 1.50 at 25° C.

The present invention is still further directed to a method of preparing a high-refractive-index optical silicone oil mixture having a refractive index of from 1.45 to 1.50 at 25° C., comprising reacting a C$_8$ to C$_{12}$ aryl-containing olefin with a mixture comprising a pentasiloxane having the formula:

HMe$_2$SiO(Me$_2$SiO)$_3$SiMe$_2$H and a disiloxane having the formula:

HMe$_2$SiOSiMe$_2$H

DETAILED DESCRIPTION OF THE INVENTION

A high-refractive-index optical silicone oil according to the present invention comprises a pentasiloxane having the formula:

RMe$_2$SiO(Me$_2$SiO)$_3$SiMe$_2$R wherein Me is methyl, each R is independently a C$_8$ to C$_{12}$ aralkyl, and the silicone oil has a refractive index of from 1.45 to 1.50 at 25° C. Preferably, R is phenethyl or 2-methylphenethyl. The refractive index of the high-refractive-index optical silicone oil of this invention can be adjusted by changing the particular R group in the formula of the pentasiloxane and is preferably from 1.46 to 1.49. The viscosity (25° C.) of the high-refractive-index optical silicone oil is typically from 3 to 100 mm$^2$/s and is preferably from 5 to 50 mm$^2$/s.

Specific examples of the high-refractive-index optical silicone oil of the present invention include, but are not limited to, pentasiloxanes having the following formulae, wherein Me is methyl and Ph is phenyl:

The high-refractive-index optical silicone oil of this invention can be synthesized by, for example, hydrosilylation using a supported platinum catalyst of an aryl-containing olefin such as styrene or α-methylstyrene with an SiH-functional pentasiloxane having the formula: HMe$_2$SiO (Me$_2$SiO)$_3$SiMe$_2$H, wherein Me is methyl, followed by removal of the supported platinum catalyst after the hydrosilylation reaction. The supported platinum catalyst can be, for example, Pt-on-carbon powder, Pt-on-silica micropowder, or Pt-on-alumina micropowder, and the support will generally carry from 0.1 to 10 weight % platinum. The supported platinum catalyst can be separated post-reaction by known methods, such as filtration or centrifugal separation. The SiH-functional pentasiloxane can itself be synthesized by a nonequilibration reaction between hexamethylcyclotrisiloxane and 1,1,3,3-tetramethyldisiloxane HMe$_2$SiOSiMe$_2$H in the presence of an acid catalyst (refer to Japanese Patent Application Number Hei 9-344298 (344,298/1997). This method produces the SiH-functional pentasiloxane in high yields and at high selectivities. The acid catalyst used in this method can be, for example, a protic acid such as hydrochloric acid, sulfuric acid, trifluoroacetic acid, or trifluoromethanesulfonic acid, or a Lewis acid such as iron chloride, aluminum chloride, zinc chloride, or titanium chloride. Hydrochloric acid and trifluoromethanesulfonic acid are preferred for this acid catalyst. The disiloxane-to-hexamethylcyclotrisiloxane molar ratio in this reaction is preferably from 0.7 to 10.0 and more preferably is from 0.9 to 5.0. The addition of water or a silanol compound to this synthesis can substantially inhibit the secondary production of compounds—such as octamethylcyclotetrasiloxane—that are produced by secondary reactions in this nonequilibration reaction. In addition, the reaction rate can be substantially improved by the addition of a polar protic or polar aprotic solvent.

A high-refractive-index optical silicone oil mixture according to the present invention comprises a pentasiloxane having the formula:

wherein Me is methyl, each R is independently a C$_8$ to C$_{12}$ aralkyl, and a disiloxane having the formula:

wherein Me and R as defined above and wherein the mixture has a refractive index of from 1.45 to 1.50 at 25° C. Preferably R is phenethyl or 2-methylphenethyl. Examples of the disiloxane include, but are not limited to, siloxanes having the following formulae, wherein Me is methyl and Ph is phenyl:

The ratio of the pentasiloxane to the disiloxane in the high-refractive-index optical silicone oil mixture of this invention is generally from 99 to 10 weight %:1 to 90 weight % and preferably is from 99 to 20 weight %:1 to 80 weight %. The mixture preferably has a refractive index at 25° C. of from 1.46 to 1.49. The refractive index of this mixture can be adjusted as necessary or desired by changing the R group in the formula of the pentasiloxane and/or disiloxane and/or by changing the ratio of the pentasiloxane to the disiloxane. The subject high-refractive-index optical silicone oil mixture should generally have a viscosity at 25° C. from 2 to 100 mm$^2$/s and preferably has a viscosity at 25° C. from 3 to 50 mm$^2$/s.

The high-refractive-index optical silicone oil mixture of this invention can be prepared by, for example, hydrosilylation using a supported platinum catalyst of an aryl-containing olefin such as styrene or α-methylstyrene with a mixture comprising an SiH-functional pentasiloxane having the formula HMe$_2$SiO(Me$_2$SiO)$_3$SiMe$_2$H and an SiH-functional disiloxane having the formula HMe$_2$SiOSiMe$_2$H, followed by removal of the supported platinum catalyst after the hydrosilylation reaction. The supported platinum catalyst can be, for example, Pt-on-carbon powder, Pt-on-silica micropowder, or Pt-on-alumina micropowder, and the support will generally carry from 0.1 to 10 weight % platinum. The supported platinum catalyst can be separated post-reaction by known methods, such as filtration or centrifugal separation.

While the high-refractive-index optical silicone oil and high-refractive-index optical silicone oil mixture of the present invention contain the pentasiloxane as their base, they may also contain additives such as an oxidation inhibitor and a refractive index adjuster. Said oxidation inhibitor can be specifically exemplified by 4,4'-thiobis(6-tert-butyl-m-cresol), 4,4'-butylidenebis(6-tert-butyl-m-cresol), 2,2'-methylenebis(4-methyl-6-tert-butylphenol), 2,2'-methylenebis(4-ethyl-6-tert-butylphenol), 2,5-di-tert-butylhydroquinone, 2,5-di-tert-amylhydroquinone, and 2,6-di-tert-butyl-p-cresol. The refractive index adjuster can be exemplified by low-volatile-fraction dimethylpolysiloxanes and methylphenylpolysiloxanes and by organic refractive index adjusters.

Because the high-refractive-index optical silicone oil and high-refractive-index optical silicone oil mixture of this invention have little volatility, a high refractive index (1.45 to 1.50 at 25° C.), and a low viscosity, they can be used as fill between the lenses for video projectors and as a fill in the connectors for optical fibers. They are particularly well suited for use in the converters, switches, and movable connectors that are used with optical fibers.

The high-refractive-index optical silicone oil and high-refractive-index optical silicone oil mixture of this invention contain a pentasiloxane having an aralkyl group, such as phenethyl or 2-methylphenethyl, as their base and as a consequence are characterized by a high refractive index (1.45 to 1.50 at 25° C.) and by little change in their refractive index upon the occurrence of volatilization. They are also characterized by ease of adjustment in their refractive index.

The high-refractive-index optical silicone oil and high-refractive-index optical silicone oil mixture of this invention are further characterized by transparency in the visible region (450 to 750 nm) and also by transparency in the near infrared region (750 to 900 nm). In addition, when the SiH-functional pentasiloxane $HMe_2SiO(Me_2SiO)_3SiMe_2H$ produced by the above-described nonequilibration reaction is used as a starting reagent for the pentasiloxane, the absence of low-molecular-weight by-products such as cyclotrisiloxane and cyclotetrasiloxane in this starting reagent results in the highly desirable feature of an almost complete absence of timewise changes in the refractive index.

EXAMPLES

The invention will be explained in greater detail in the following through working examples. The values reported in the examples for the refractive index, viscosity, and specific gravity were all measured at 25° C. The abbreviation Me in the examples represents methyl, while Ph represents phenyl. The light transmittance values reported in the examples were measured using air as the blank.

Reference Example 1

The following were introduced into a flask and stirred at 35° C. 2,676 g hexamethylcyclotrisiloxane, 1,780 g 1,1,3,3-tetramethyldisiloxane, 200 g toluene, 3 g water, 120 g acetonitrile, and 200 μL trifluoromethanesulfonic acid. After 9 hours it was confirmed by gas chromatography (GLC) that the hexamethylcyclotrisiloxane conversion had reached 95%, at which point the reaction was water-cooled down to room temperature. The reaction was then stopped by the addition of 0.26 g aqueous ammonia. The volatiles were subsequently stripped from the reaction mixture at reduced pressure using an evaporator. After cooling, the salt by-product was filtered off on filter paper to yield 3,963 g of a liquid reaction product. Analysis of this reaction product by GLC and nuclear magnetic resonance (NMR) confirmed it to be an SiH-functional pentasiloxane having the formula $HMe_2SiO(Me_2SiO)_3SiMe_2H$. The purity of this pentasiloxane was 94%.

Example 1

Figure 1:
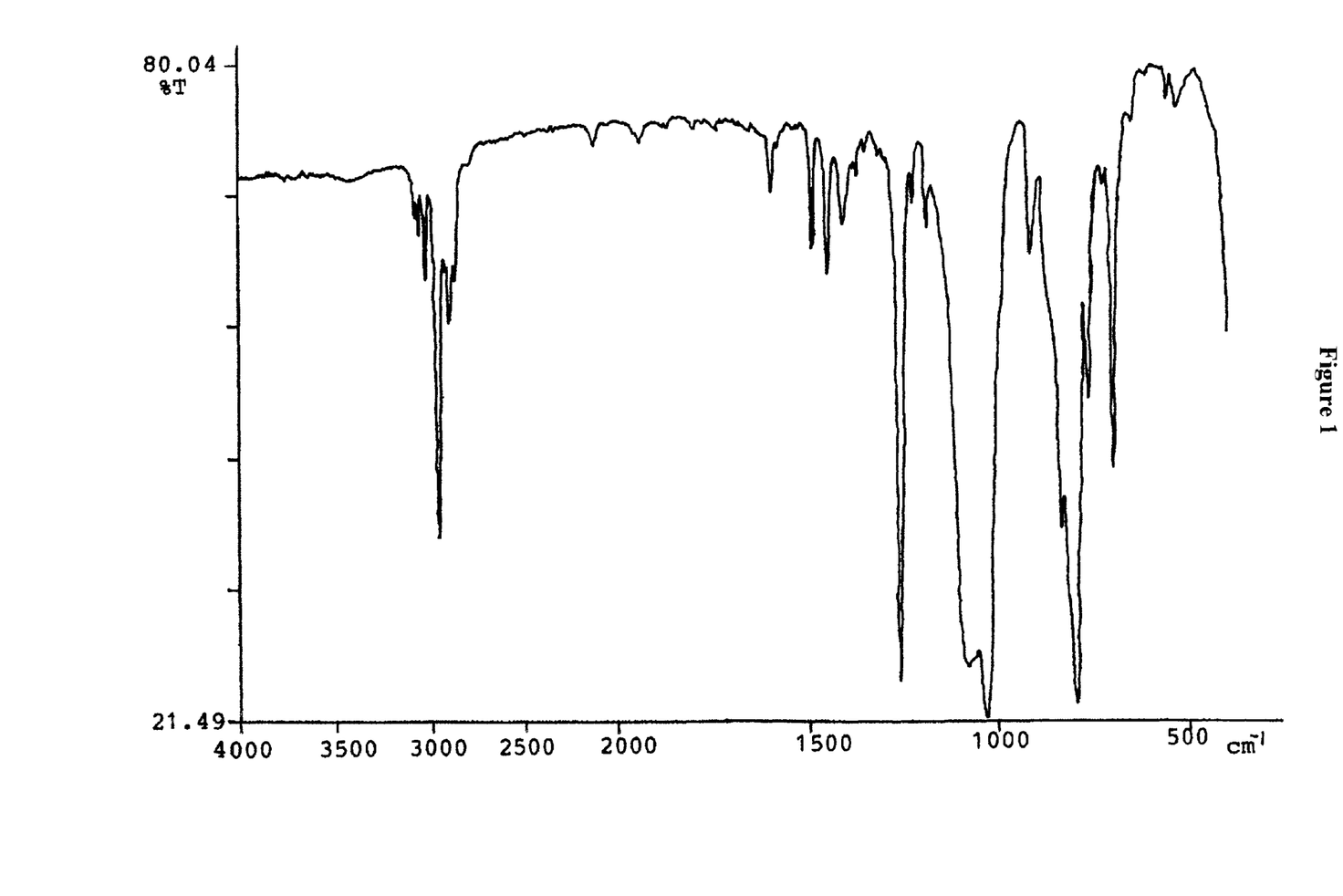
FIG. 1 shows a chart of the infrared absorption spectrum of the silicone oil prepared in Example 1.

0.7 g Pt-on-carbon powder (Pt content=1 weight %) was added to 71.2 g (0.2 mol) of the SiH-functional pentasiloxane $HMe_2SiO(Me_2SiO)_3SiMe_2H$ synthesized in Reference Example 1 and the mixture was heated to 150° C. 49.6 g (0.42 mol) α-methylstyrene was then added dropwise while stirring. After the completion of this addition, the reaction was stirred and heated for an additional 3 hours at 150° C. After then cooling and filtering, the volatiles were removed by heating up to 150° C. while under reduced pressure. This resulted in 106 g of a transparent reaction product. Analysis of this reaction product by NMR and IR confirmed it to be a silicone oil having the following structure.

Figure 2:
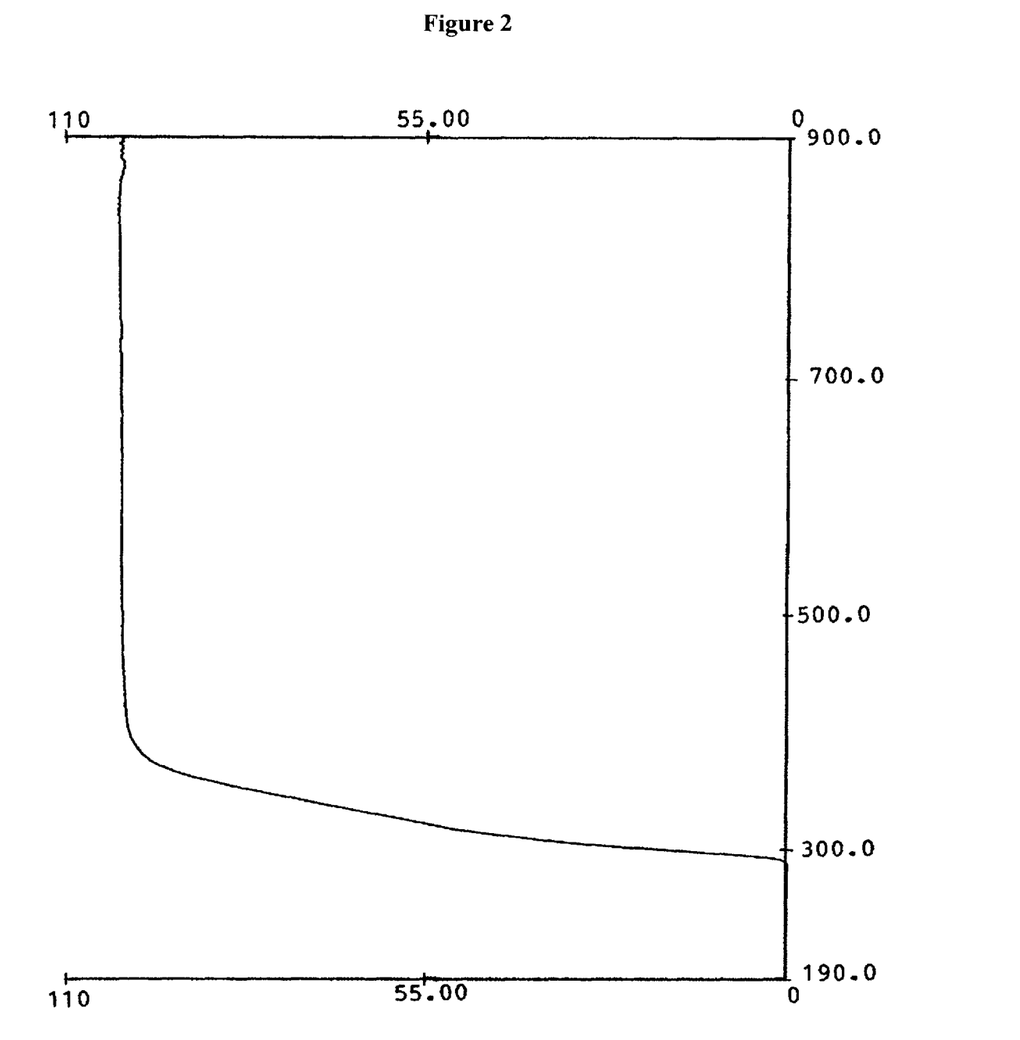
FIG. 2 shows a chart of the light transmittance of the silicone oil prepared in Example 1.
Figure 3:
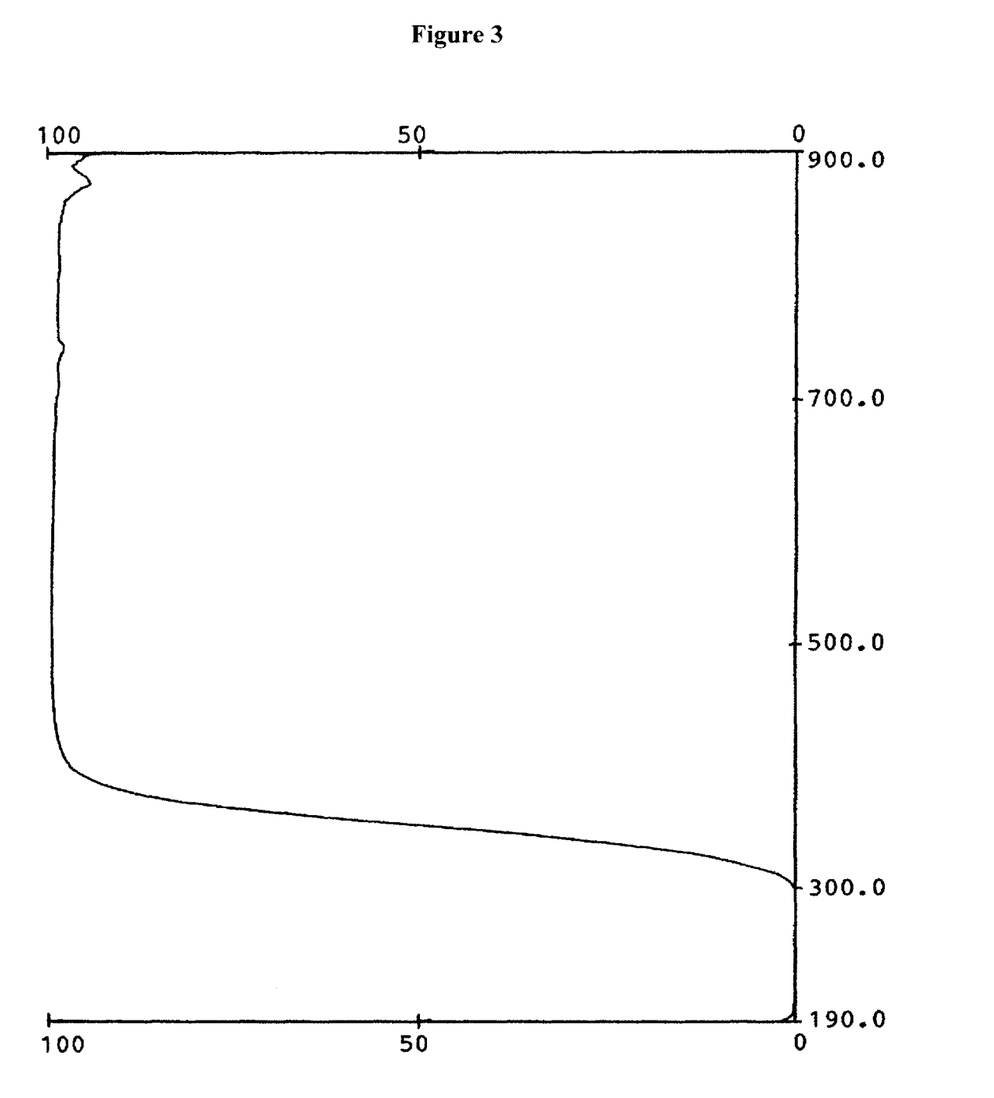
FIG. 3 shows a chart of the light transmittance of the silicone oil mixture prepared in Example 2.
Figure 4:
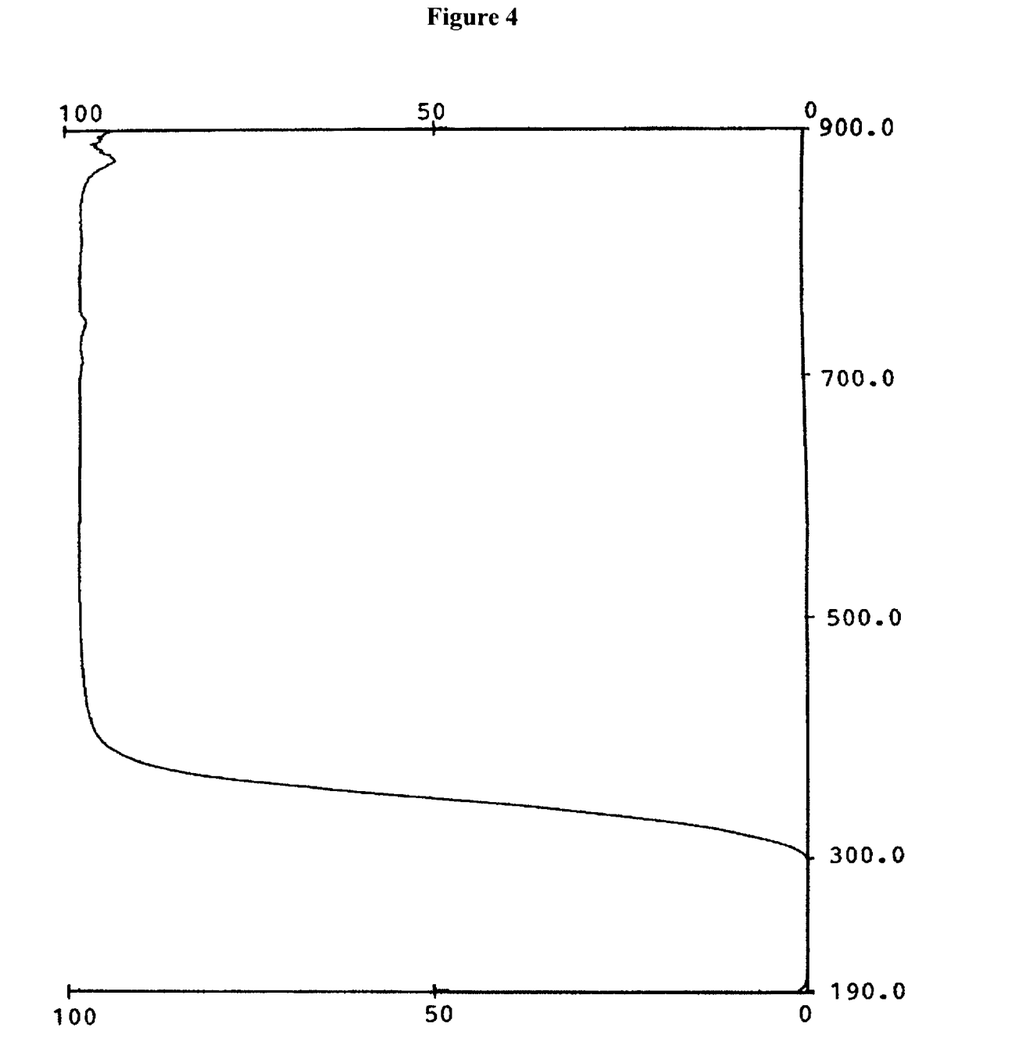
FIG. 4 shows a chart of the light transmittance of the silicone oil mixture prepared in Example 3.
Figure 5:
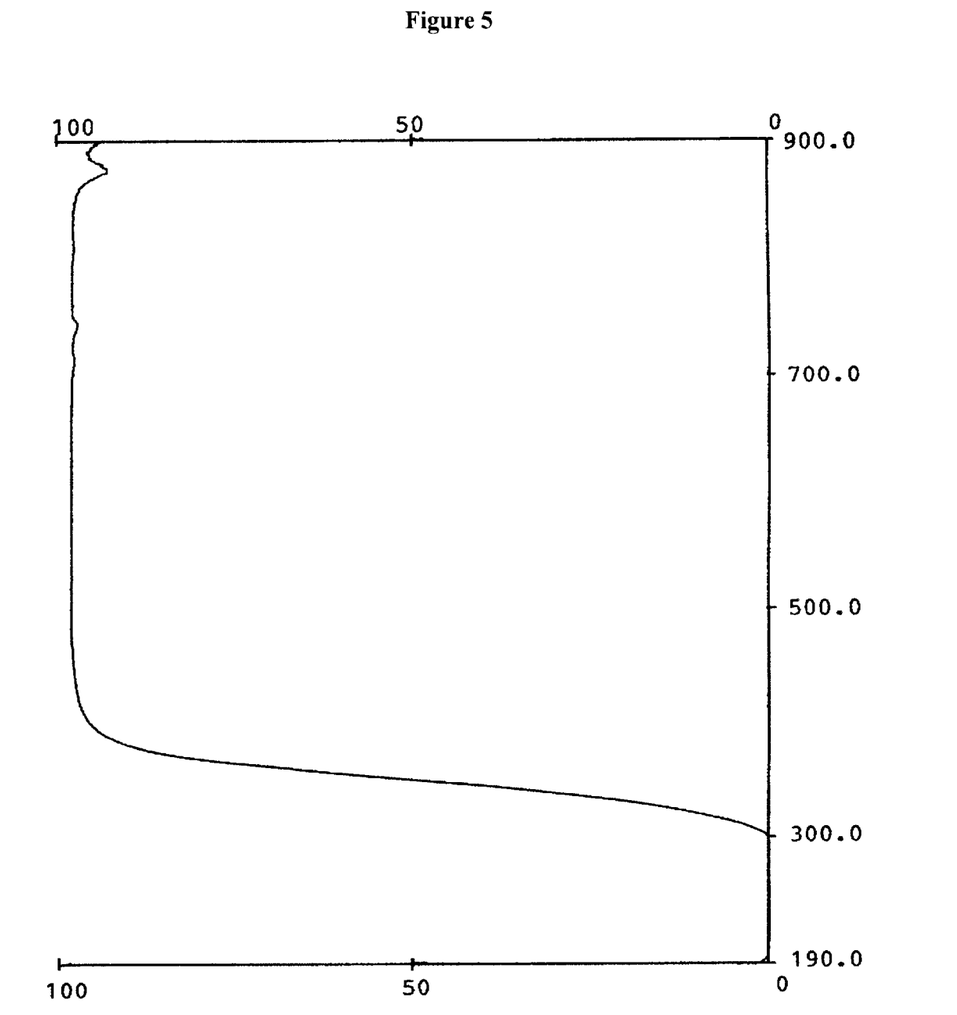
FIG. 5 shows a chart of the light transmittance of the silicone oil mixture prepared in Example 4.

This silicone oil had a refractive index of 1.466, a viscosity of 9 mm²/s, and a specific gravity of 0.96. When this silicone oil was placed in a 1-mm quartz cell and submitted to measurement of the light transmittance using a light transmittance instrument (UV-265FW from Shimadzu Seisakusho), it was found to have an extremely high light transmittance over the broad range from 400 to 900 nm. In another test, 1.5 g of this silicone oil was sampled out to an aluminum dish and held for 30 minutes in a 150° C. oven. The resulting weight loss to heating was no more than 6.4 weight %. Moreover, since the residual silicone oil had a refractive index of 1.466, no change in refractive index was caused by this heating episode.

Example 2

0.7 g Pt-on-carbon powder (Pt content=1 weight %) was added to a previously prepared mixture of 45.8 g (0.124 mol) of the SiH-functional pentasiloxane $HMe_2SiO(Me_2SiO)_3SiMe_2H$ synthesized in Reference Example 1 and 9.6 g (0.065 mol) of the SiH-functional disiloxane $HMe_2SiOSiMe_2H$. After the resulting catalyst+siloxane mixture had been heated to 150° C., 49.6 g (0.42 mol) α-methylstyrene was added dropwise while stirring. After the completion of this addition, the reaction was stirred and heated for an additional 3 hours at 150° C. This was followed by cooling, filtration, and removal of the volatiles by heating up to 150° C. while under reduced pressure. The result was 97 g of a transparent reaction product. Analysis of this reaction product by NMR and IR confirmed it to be a silicone oil mixture containing 75 weight % of a pentasiloxane having the following structure:

and 25 weight % of a disiloxane having the following structure:

This silicone oil mixture had a refractive index of 1.475, a viscosity of 9 mm²/s, and a specific gravity of 0.95. 1.5 g of this silicone oil mixture was sampled out to an aluminum dish and held for 30 minutes in a 150° C. oven. The resulting weight loss to heating was 9.1 weight %. Moreover, since the residual silicone oil mixture had a refractive index of 1.475, no change in refractive index was caused by this heating episode.

Example 3

0.7 g Pt-on-carbon powder (Pt content=1 weight %) was added to a previously prepared mixture of 30.5 g (0.083 mol) of the SiH-functional pentasiloxane $HMe_2SiO(Me_2SiO)_3SiMe_2H$ synthesized in Reference Example 1 and 19.3 g (0.13 mol) of the SiH-functional disiloxane $HMe_2SiOSiMe_2H$. After the resulting catalyst+siloxane mixture had been heated to 150° C., 55.3 g (0.47 mol)

α-methylstyrene was added dropwise while stirring. After the completion of this addition, the reaction was stirred and heated for an additional 3 hours at 150° C. This was followed by cooling, filtration, and removal of the volatiles by heating up to 150° C. while under reduced pressure. The result was 96 g of a transparent reaction product. Analysis of this reaction product by NMR and IR confirmed it to be a silicone oil mixture containing 50 weight % of a pentasiloxane having the following structure:

and 50 weight % of a disiloxane having the following structure:

This silicone oil mixture had a refractive index of 1.485. 1.5 g of this silicone oil mixture was sampled out to an aluminum dish and held for 30 minutes in a 150° C. oven. The resulting weight loss to heating was 14.5 weight %. Moreover, since the refractive index measured for the residual silicone oil mixture was 1.484, almost no change in refractive index was caused by this heating episode.

Example 4

0.7 g Pt-on-carbon powder (Pt content=1 weight %) was added to a previously prepared mixture of 15.6 g (0.041 mol) of the SiH-functional pentasiloxane $HMe_2SiO(Me_2SiO)_3SiMe_2H$ synthesized in Reference Example 1 and 28.9 g (0.195 mol) of the SiH-functional disiloxane $HMe_2SiOSiMe_2H$. After the resulting catalyst+siloxane mixture had been heated to 150° C., 61.3 g (0.52 mol) α-methylstyrene was added dropwise while stirring. After the completion of this addition, the reaction was stirred and heated for an additional 3 hours at 150° C. This was followed by cooling, filtration, and removal of the volatiles by heating up to 150° C. while under reduced pressure to yield a transparent reaction product. Analysis of this reaction product by NMR and IR confirmed it to be a silicone oil mixture containing 25 weight % of a pentasiloxane having the following structure:

and 75 weight % of a disiloxane having the following structure:

This silicone oil mixture had a refractive index of 1.494. 1.5 g of this silicone oil mixture was sampled out to an aluminum dish and held for 30 minutes in a 150° C. oven. The resulting weight loss to heating was 16 weight %. Moreover, since the refractive index measured for the residual silicone oil mixture was 1.494, no change in refractive index was caused by this heating episode.

Comparative Example 1

0.7 g Pt-on-carbon powder (Pt content=1 weight %) was added to a previously prepared mixture of 28.1 g (0.19 mol) of the SiH-functional pentamethyldisiloxane $HMe_2SiOSiMe_3$ and 24.8 g (0.21 mol) α-methylstyrene and the resulting mixture was heated to 150° C. while stirring. The reaction was subsequently stirred and heated for an additional 3 hours at 150° C. This was followed by cooling, filtration, and removal of the volatiles by heating up to 150° C. while under reduced pressure. The result was 45 g of a transparent reaction product. Analysis of this reaction product by NMR and IR confirmed it to be a silicone oil having the following structure:

This silicone oil had a refractive index of 1.46 and a viscosity of $mm^2/s$. 1.5 g of this silicone oil was sampled out to an aluminum dish and held for 30 minutes in a 150° C. oven. The resulting weight loss to heating was 100 weight % and this silicone oil thus underwent complete volatilization.

Comparative Example 2

0.7 g Pt-on-carbon powder (Pt content=1 weight %) was added to a previously prepared mixture of 32.2 g (0.02 mol) of the SiH-functional polydimethylsiloxane $HMe_2SiO(Me_2SiO)_{20}SiMe_2H$ and 11.8 g (0.1 mol) α-methylstyrene and the resulting mixture was heated to 150° C. while stirring. The reaction was subsequently stirred and heated for an additional 3 hours at 150° C. This was followed by cooling, filtration, and removal of the volatiles by heating up to 150° C. while under reduced pressure. The result was 35 g of a transparent reaction product. Analysis of this reaction product by NMR and IR confirmed it to be a silicone oil having the following structure:

This silicone oil had a refractive index of 1.42.

What is claimed is:

1. A high-refractive-index optical silicone oil mixture, comprising a pentasiloxane having the formula:

wherein Me is methyl, each R is independently a $C_8$ to $C_{12}$ aralkyl, and a disiloxane having the formula:

wherein Me and R as defined above and wherein the mixture has a refractive index of from 1.45 to 1.50 at 25° C.

2. The optical silicone oil mixture according to claim 1, wherein each R is independently phenethyl or 2-methylphenethyl.

3. The optical silicone oil mixture according to claim 1, wherein the refractive index is from 1.46 to 1.49 at 25° C.

4. The optical silicone oil mixture according to claim 1, wherein the ratio of the pentasiloxane to the disiloxane is from 99 to 10 weight %:1 to 90 weight %.

5. The optical silicone oil mixture according to claim 4, wherein the ratio of the pentasiloxane to the disiloxane is from 99 to 20 weight %:1 to 80 weight %.

6. The optical silicone oil mixture according to claim 1, wherein the mixture has a viscosity of from 2 to 100 mm$^2$/s at 25° C.

7. The optical silicone oil according to claim 6, wherein the viscosity is from 3 to 50 mm$^2$/s at 25° C.

8. A method of preparing a high-refractive-index optical silicone oil mixture having a refractive index of from 1.45 to 1.50 at 25° C., comprising reacting a $C_8$ to $C_{12}$ aryl-containing olefin with a mixture comprising a pentasiloxane having the formula:

$$HMe_2SiO(Me_2SiO)_3SiMe_2H$$

and a disiloxane having the formula:

$$HMe_2SiOSiMe_2H$$

in the presence of a supported platinum catalyst.

9. The method according to claim 8, wherein the aryl-containing olefin is styrene or α-methylstyrene.

* * * * *